March 13, 1934. H. F. OLSON ET AL Re. 19,115

SOUND PICK-UP DEVICE

Original Filed May 20, 1932 3 Sheets-Sheet 1

INVENTORS
HARRY F. OLSON
J. WEINBERGER
BY H. S. Grover
ATTORNEY

SOUND PICK-UP DEVICE

Original Filed May 20, 1932 3 Sheets-Sheet 2

Fig. 6

$X_{RG}$ = MECHANICAL REACTANCE OF THE RIBBON
$X_{AG}$ = MECHANICAL REACTANCE DUE TO AIR
$R_{AG}$ = MECHANICAL RESISTANCE DUE TO AIR
$\phi$ = PHASE ANGLE BETWEEN PRESSURE IN PLANE SOUND WAVE AND THE RIBBON VELOCITY.

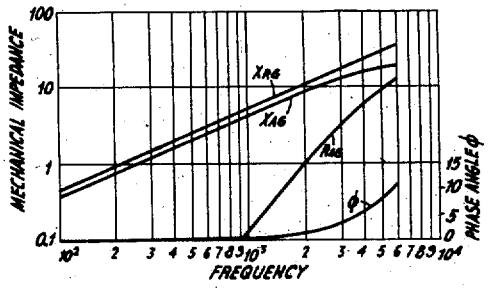

Fig. 7

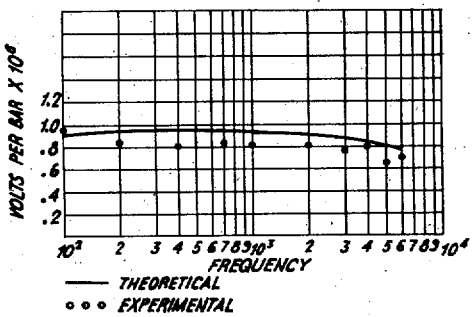

Fig. 8

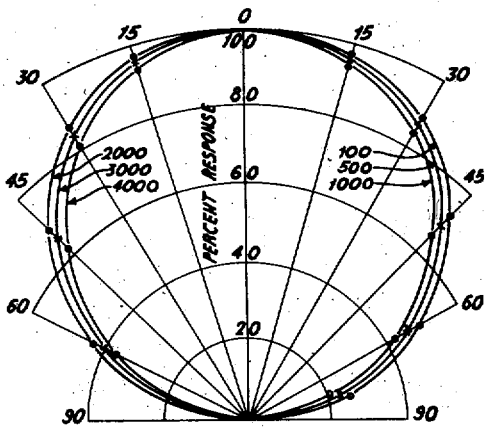

Fig. 9

$X_{RP}$ = MECHANICAL REACTANCE OF THE RIBBON
$X_{AP}$ = MECHANICAL REACTANCE DUE TO AIR
$R_{AP}$ = MECHANICAL RESISTANCE DUE TO AIR
$R_{LP}$ = MECHANICAL RESISTANCE TERMINATING RIBBON
$\phi$ = PHASE ANGLE BETWEEN PRESSURE IN PLANE SOUND WAVE AND THE RIBBON VELOCITY

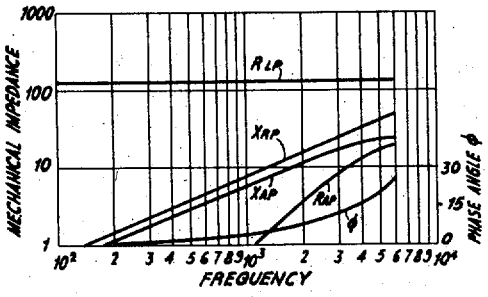

Fig. 10

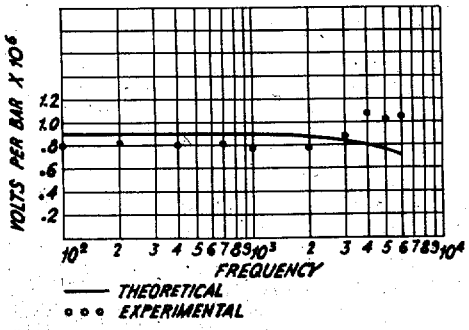

Fig. 14

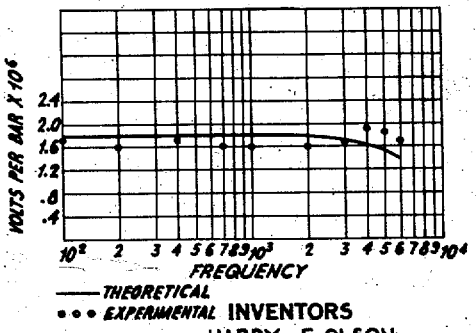

INVENTORS
HARRY F. OLSON
J. WEINBERGER
BY H. S. Grover
ATTORNEY

SOUND PICK-UP DEVICE

Original Filed May 20, 1932 3 Sheets-Sheet 3

INVENTORS
HARRY F. OLSON
BY J. WEINBERGER
H. B. Brown
ATTORNEY

Reissued Mar. 13, 1934

Re. 19,115

UNITED STATES PATENT OFFICE 19,115

SOUND PICK-UP DEVICE

Harry F. Olson, Collingswood, and Julius Weinberger, Haddonfield, N. J., assignors to Radio Corporation of America, a corporation of Delaware Original No. 1,892,645, dated December 27, 1932, Serial No. 612,466, May 20, 1932. Application for reissue April 4, 1933, Serial No. 664,441

8 Claims. (Cl. 179—138)

Figure 1:
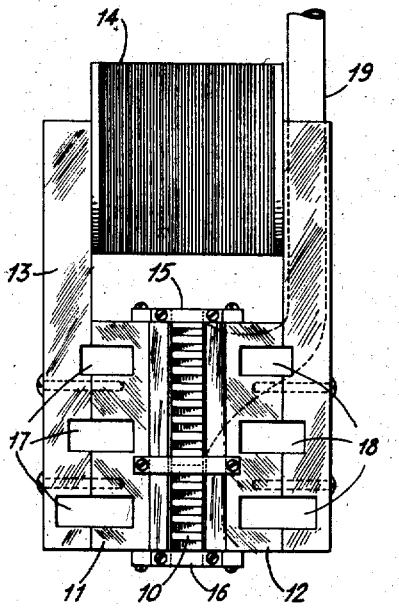

Our invention relates to sound pickup devices such as ribbon microphones, and has for its principal object the provision of an improved pickup device which is capable of collecting sound from a predetermined range of directions and excluding sound not originating within this range.

A further object is the provision of a microphone which responds both to the pressure component and to the velocity or pressure gradient component of the sound wave.

Figure 2:
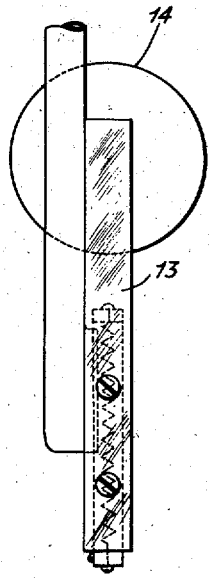
Figure 3:
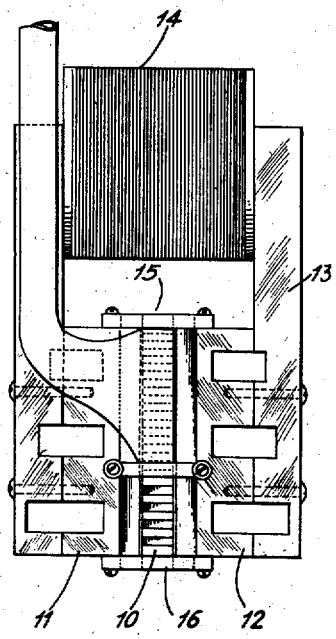
Figure 4:
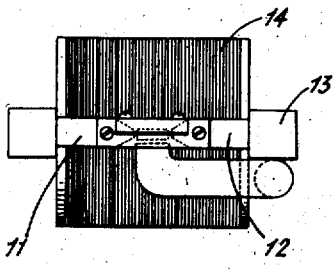
Figure 5:
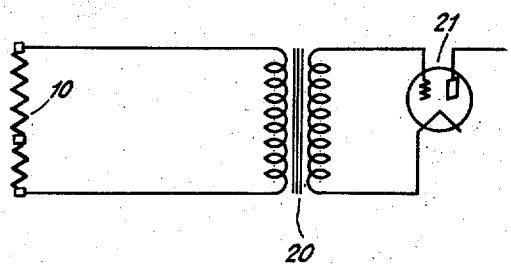
Figure 12:
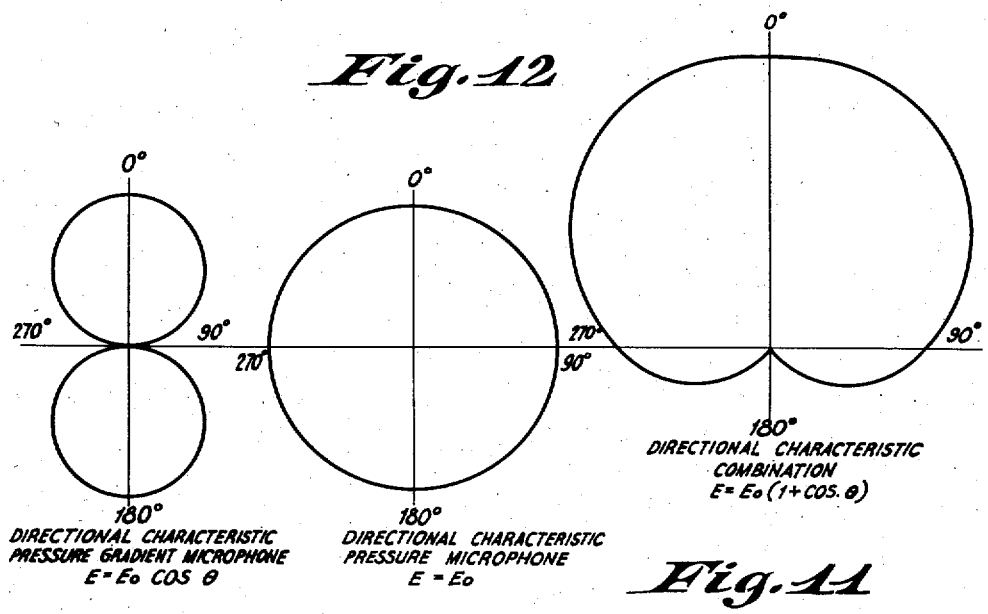
Figure 11:
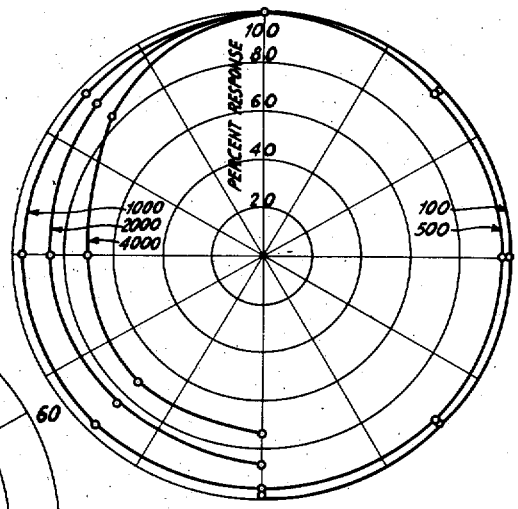
Figure 13:
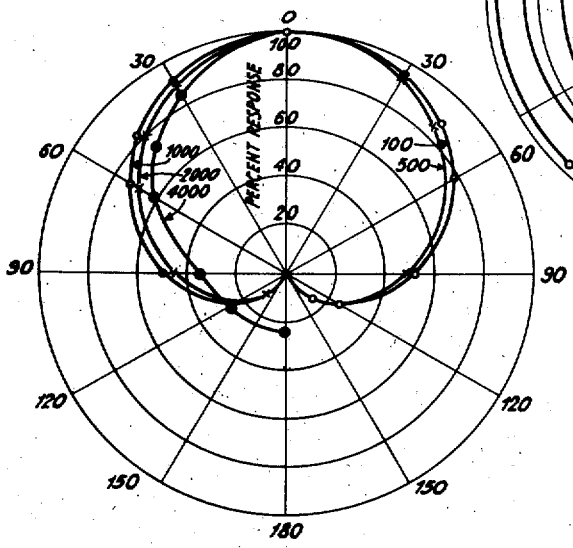

Referring to the drawings,

Fig. 1 is a front view of a microphone constructed in accordance with our invention, Figs. 2, 3, and 4 are, respectively, side, back and bottom views of this microphone, Fig. 5 illustrates the electrical connections of the microphone, Figs. 6 to 8 illustrate different characteristics of a velocity or pressure gradient microphone, Figs. 9 to 11 illustrate similar characteristics of a microphone responsive to the pressure component of a sound wave, Fig. 12 illustrates the directional characteristic of the pressure gradient microphone, the pressure microphone and the microphone illustrated by Figures 1 to 5, and Fig. 13 illustrates the observed directional characteristics of the improved microphone.

In order that sound radiation may be projected from one point to another point or area with a maximum of efficiency and a minimum of interference from reflecting surfaces directional sound radiators have been almost universally employed for sound sources in large scale reproduction of sound. A similar directivity has been found to be desirable in the sound pickup system to improve the ratio of direct to generally reflected sound and to otherwise discriminate against undesirable sounds.

One of the important factors in a directive sound pickup system is the solid angle over which sound is received without appreciable attenuation. This must be large enough to include the average area of action. At the same time the angle should be sufficiently small so that an appreciable gain in discrimination against undesirable sounds is obtained. Another requirement is a directional characteristic which is independent of the frequency. A system which does not possess this characteristic will produce frequency discrimination. Due to the large frequency band of the audible spectrum the use of directional systems which depend upon interference become exceedingly cumbersome and complex if an attempt is made to obtain uniform directional characteristics.

The ribbon microphone is a simple directional pickup system in which the directional characteristics are independent of the frequency. The ribbon microphone is an acoustic doublet, which means that the response is a function of the cosine of the angle between the normal to the ribbon and the direction of propagation of the incident sound. The ribbon microphone is a pressure gradient microphone and its response corresponds to the velocity component of a sound wave. The combination of this type of microphone with a microphone whose response corresponds to the pressure component of a sound wave results in the uni-directional microphone hereinafter described in connection with Figs. 1 to 5.

The pressure gradient ribbon microphone consists of a light corrugated metallic ribbon suspended in a magnetic field and freely accessible to sound vibrations from both sides. The vibration of the ribbon due to an impressed sound wave leads to the induction of an E. M. F. corresponding to the undulations of the incident sound wave.

The front and back of the ribbon are separated by an acoustic path $\Delta X$. When this system is placed in a plane wave sound field a difference in pressure between the two sides of the ribbon exists due to the difference in phase between the two sides. It is this difference in pressure due to the difference in phase that actuates the ribbon in the ribbon microphone.

In this analysis we will assume a plane wave sound field. Let the pressure at the front of the ribbon be $$(1) \qquad p = Kc\rho A \sin K\left(ct - \frac{\Delta x}{2}\right)$$

where $K = \frac{2\pi}{\lambda}$ $\lambda$ = wavelength
$\Delta X$ = acoustic path between the two sides of the ribbon,
$C$ = velocity of propagation
$A$ = amplitude of $\phi$ and $\phi$ = velocity potential The pressure at the back of the ribbon is $$(2) \qquad P = Kc\rho A \sin K\left(ct + \frac{\Delta X}{2}\right)$$

The resultant pressure on the ribbon will be the difference in pressure between the two sides and is given by the expression $$(3) \qquad \Delta p = -2Kc\rho A \cos(Kct) \sin\left(\frac{K\Delta X}{2}\right)$$

The velocity of the ribbon is given by $$(4) \qquad \dot{X} = \frac{\Delta p S_G}{iX_{RG} + Z_{AG}}$$

where $\Delta p S_G$ = the total difference in pressure acting upon the ribbon
$X_{RG}$ = the reactance due to the mass of the ribbon
$Z_{AG}$ = the impedance due to the air load upon the ribbon
$S_G$ = area of the ribbon.
$Z_{AG} = R_{AG} + iX_{AG}$ The ribbon is spaced by a few mils from the pole pieces of the magnetic structure. This aperture gives rise to a mechanical impedance. In general the impedance due to the spacing is large compared to the mass reactance of the ribbon and may be neglected. The reactance $X_{RG}$ due to the mass of the ribbon and the components of the air load $Z_{AG}$ are shown in Fig. 6.

The generated E. M. F. induced by the motion of the ribbon is given by $$(5) \qquad E = Bl_G\dot{X} = \frac{Bl_G \Delta p S_G}{iX_{RG} + Z_{AG}}$$

where B = flux density
$l_G$ = length of the ribbon.
$S_G$ = area of ribbon.

The E. M. F. generated by the ribbon computed from the equation is shown in Fig. 7. As will be seen the experimental results agree with the theoretically predicted response.

The above considerations have been concerned with the direction of propagation normal to the plane of the ribbon. When the normal to the face of the microphone is inclined by an angle $\theta$ to the line of propagation the acoustic path from the front to the back of the ribbon is multiplied by a factor $\cos\theta$. When $\theta$ is 90° the pressure difference between the two sides is zero and the ribbon remains stationary. The observed directional characteristics of this microphone are shown in Fig. 8.

The velocity of the ribbon from Equation (4) can be written $$(6) \qquad \dot{X} = -2S_G Kc\rho A \left[\frac{\sin Kct \sin\phi + \sin\left(Kct + \frac{\pi}{2}\right)\cos\psi}{\sqrt{R^2_{AG} + (X_{RG} + X_{AG})^2}}\right] \sin\left(\frac{K\Delta X}{2}\right)\cos\theta$$

where $$\psi = \tan^{-1}\frac{X_{RG} + X_{AG}}{R_{AG}}$$

$\theta$ = angle between the direction of propagation and the normal to the plane of the ribbon.

The phase angle between the pressure at $X=O$ and Equation 6 above is shown in Fig. 6.

The response of the pressure gradient ribbon microphone described above is a measure of the velocity component in a sound wave. By a suitable modification this instrument may be adapted to respond to the pressure component in a sound wave. One way in which this may be accomplished will be described.

In this mechanical system the velocity is given by $$(7) \qquad \dot{X} = \frac{F}{Z_P} = \frac{PS_P}{Z_P}$$

where $\dot{X}$ = velocity
P = sound pressure
$S_P$ = area of the ribbon
$Z_P$ = the total mechanical impedance The generated E. M. F. induced by the motion of the ribbon is given by $$(8) \qquad E = Bl_P\dot{X}$$

where B = flux density
$l_P$ = length of the ribbon

If the impedance Z is real and independent of the frequency the induced E. M. F. will be independent of the frequency.

To adapt the ribbon microphone to pressure operation the back side of the ribbon is enclosed and terminated in a mechanical resistance which is large compared to the reactive components. The impedance of the entire mechanical system is given by $$(9) \qquad Z = iX_{RP} + R_{AP} + iX_{AP} + R_L$$

where $X_{RP}$ = mass reactance of the ribbon,
$R_{AP} + iX_{AP}$ = air load upon the open side of the ribbon,
$R_L$ = resistance terminating the back of the ribbon.

As in the case of the pressure gradient microphone the impedance due to space between the ribbon and the pole pieces may be neglected. Equation 9 shows that to maintain constant velocity in this system $R_L$ must be made large compared to $R_{AP} + i(X_{AP} + X_{RP})$. This can be accomplished by proper choice of the resistance $R_L$.

The values of $X_{RP}$, $X_{AP}$, $R_{AP}$ and $R_L$ for a particular microphone are shown in Fig. 9. As will be seen the resistive component is large compared to the reactive component. The phase angle between the velocity of the ribbon and the pressure is shown in Fig. 9.

The E. M. F. generated by the ribbon computed from Equation 8 is shown in Fig. 10. As will be seen the experimental results agree with the theoretically predicted response.

A true pressure measuring instrument should not discriminate against any direction. To attain this objective in any pressure operated microphone the dimensions of the component parts must be made small compared to the wave length of the sound wave. This can be accomplished in the ribbon type of microphone by making the field structure open or "well ventilated". The directional characteristics of this microphone are shown in Fig. 11. These results indicate that the response is independent of the direction up to 3000 cycles. Above this frequency the pressure at face of the ribbon is greater than that in free space for $\theta=0$. This results in a slight increase in the response above this frequency and as a consequence there is a deviation from uniform response in all directions above 3000 cycles.

In the preceding discussion we have considered two types of ribbon microphones, namely, a microphone in which the response is a measure of the velocity component in the sound wave, and a microphone in which the response is a measure of the pressure in the sound wave.

By a suitable combination of the pressure microphone and the velocity or pressure gradient microphone a uni-directional microphone is produced. Such a combination is illustrated by Figures 1 to 5. This combination includes a corrugated ribbon 10 interposed between pole pieces 11 and 12 of a magnet 13 provided with a field coil 14. The ribbon 10 is supported in the magnetic field produced between the pole pieces 11 and 12, a member 15 being attached to its upper end and a member 16 being attached to its lower end. The current generated by the microphone is transmitted through terminals (not shown) connected to its opposite ends. It will be noted that the pole pieces 11 and 12 are provided with ventilating slots 17 and 18 and that a pipe or conduit 19 is provided at its lower end with an enlarged opening which is mounted on the back of the device and covers the upper part of the ribbon 10.

With this construction the lower part of the ribbon responds to the velocity or pressure gradient component of the sound wave and the upper part of the ribbon responds to the pressure component of the sound wave. Theoretically, the pipe 19 should be of indefinite length to be an acoustic resistance. This, of course, is impossible. Substantially the same result is produced by a pipe filled with loosely packed felt for preventing reflections from its open end. Thus, with a pipe about three feet long the requirements of an acoustic resistance of appropriate size is obtained. As indicated by Fig. 5, the single ribbon 10 of the pressure and velocity or pressure gradient microphone components may be connected in series to the input transformer 20 of an amplifier 21.

With the ribbons in the two microphones connected in series the combined generated E. M. F. is given by $$(10) \qquad E_V=\frac{B_P p S_G}{Z_P}+\frac{B_{PG}\triangle p S_P}{Z_{RG}+Z_{AG}}\cos\theta$$

As will be seen from Fig. 6 the velocity of the ribbon in the pressure gradient microphone is practically in phase with the pressure in a plane sound wave. Figure 9 shows that the velocity of the ribbon in the pressure microphone is practically in phase with the pressure in a plane sound wave. Therefore, if the sensitivity of the two microphones are made equal for $\theta=0$ the resultant characteristic will be a cardioid of revolution with the axis of revolution normal to the plane of the ribbons. This is illustrated graphically in Fig. 12.

The observed directional characteristics of the combination are shown in Fig. 8. It will be seen that these directional characteristics are practically cardioids of revolution up to 3000 cycles. Above this frequency the velocity of the ribbon in the pressure gradient microphone is slightly out of phase with the pressure. The same is true of the pressure microphone. Therefore, we would expect some deviation from the cardioid of revolution at the higher frequencies. This is shown by the directional characteristics in Fig. 13.

The frequency characteristic of the combination for $\theta=0$ is shown in Fig. 14.

The efficiency of response of the uni-directional microphone in receiving sound originating in random directions will now be derived. The voltage output of the uni-directional microphone for sound originating in the direction $\theta$ is $$E_U=E_O(1+\cos\theta)$$

The output of a non-directional microphone for sound originating in any direction is $$E_{ND}=2E_O$$

This shows that the two microphones have the same sensitivity for $\phi=0$.

The efficiency of energy response of the uni-directional microphone for sounds originating in random directions, all directions being equally probable, is efficiency=

$$\frac{\sum_{\phi=O}^{\phi=4\pi} E^2_{U\phi}}{\sum_{\phi=O}^{\phi=4\pi} E_{ND\phi}}=\frac{2\pi E_O^2\int_0^\pi (1+\cos\theta)\sin d\theta}{16\pi E_O^2}=\frac{1}{3}$$

The following conclusion can be drawn: The energy response of the uni-directional microphone to sound originating in random directions is one-third that of a non-directional microphone. For the same allowable reverberation the uni-directional microphone can be used at 1.7 the distance of a non-directional microphone.

The large solid angle over which this microphone receives sound without appreciable attenuation indicates that practically any action can be covered with a single microphone.

Referring to Fig. 12 it will be seen that for angles larger than 90° the response is relatively small. In general, undesirable sounds such as camera noise will fall in this region. Therefore, the particular directional characteristics exhibited by this microphone will be found very useful in overcoming undesirable sounds in sound motion picture recording or broadcast sound pickup, where desired sounds originate in front and undesired sounds generally to the rear of the microphone.

Having thus described our invention, what we claim is:

1. A microphone including a single means one portion of which is responsive to the pressure gradient of a sound wave and another portion of which is responsive to the pressure of said wave.

2. A microphone including a ribbon one part of which is responsive to the velocity component of a sound wave and another part of which is responsive to the pressure of said wave.

3. The combination of means for producing a magnetic field, an elongated conductor mounted in said field, and means arranged to render only a part of said conductor responsive to the pressure gradient of a sound wave.

4. The combination of means for producing a magnetic field, an elongated conductor mounted in said field, and means including a pipe in close proximity to a part of said conductor for rendering said part responsive to the pressure of a sound wave.

5. The combination of means for producing a magnetic field, an elongated conductor mounted in said field, and means including a pipe containing an anti-reflecting material and in close proximity to a part of said conductor for rendering said part responsive to the pressure of a sound wave.

6. The combination of means for producing a magnetic field, an elongated conductor mounted in said field, and means including a pipe loosely packed with felt and in close proximity to a part of said conductor for rendering said part responsive to the pressure of a sound wave.

7. The combination of means for producing a magnetic field, an elongated conductor mounted in said field, and an acoustic means adjacent a part of said conductor for rendering said part responsive to the pressure of a sound wave.

8. The combination of means for producing a magnetic field, an elongated conductor mounted in said field, means arranged to render only a part of said conductor responsive to the pressure of a sound wave, and electrical amplifying means connected to the opposite ends of said conductor.

HARRY F. OLSON.
JULIUS WEINBERGER.